US006771492B2

(12) United States Patent
DeLuga et al.

(10) Patent No.: US 6,771,492 B2
(45) Date of Patent: Aug. 3, 2004

(54) PORTABLE COMPUTER HAVING REMOVABLE COMPONENT COVER

(75) Inventors: Ronald E. DeLuga, Spring, TX (US); David A. Hulsebosch, Spring, TX (US); Michele Bovio, Banchette (IT)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 09/929,876

(22) Filed: Aug. 14, 2001

(65) Prior Publication Data

US 2002/0044408 A1 Apr. 18, 2002

(51) Int. Cl.$^7$ ................................................ G06F 1/16
(52) U.S. Cl. ....................... 361/680; 361/679; 361/683; 312/223.1
(58) Field of Search ............................... 361/680–686, 361/724–727; 364/708.1; 360/137; 70/58, 158, 159, 163–166; 312/223.1, 217, 223.2, 216, 222, 291; 248/551–553, 118, 118.1; 190/63, 64, 128, 106, 111, 119, 121, 900–902; 220/256, 326; 292/175, DIG. 73; 400/714, 715, 691

(56) References Cited

U.S. PATENT DOCUMENTS

| | | | | |
|---|---|---|---|---|
| 5,214,572 A | * | 5/1993 | Cosimano et al. | 361/802 |
| 5,526,226 A | * | 6/1996 | Katoh et al. | 361/680 |
| 5,572,399 A | * | 11/1996 | Shirato et al. | 361/680 |
| 5,576,929 A | * | 11/1996 | Uchiyama et al. | 361/680 |
| 5,649,750 A | * | 7/1997 | Ishii et al. | 312/223.2 |
| 5,808,861 A | * | 9/1998 | Nakajima et al. | 361/680 |
| 6,141,667 A | * | 10/2000 | Duff | 708/100 |
| 6,175,488 B1 | * | 1/2001 | Seto et al. | 361/683 |
| 6,462,937 B1 | * | 10/2002 | Liao et al. | 361/680 |
| 6,510,048 B2 | * | 1/2003 | Rubenson et al. | 361/680 |

* cited by examiner

Primary Examiner—Michael Datskovsky

(57) ABSTRACT

An electronic device, such as a portable computer, incorporates a removable cover. The cover is readily removed without tools and provides access to a variety of components that may require servicing, substitution, component upgrades, etc. The component cover utilizes a variety of retention features that provide stability while permitting easy attachment and opening of the cover.

30 Claims, 5 Drawing Sheets

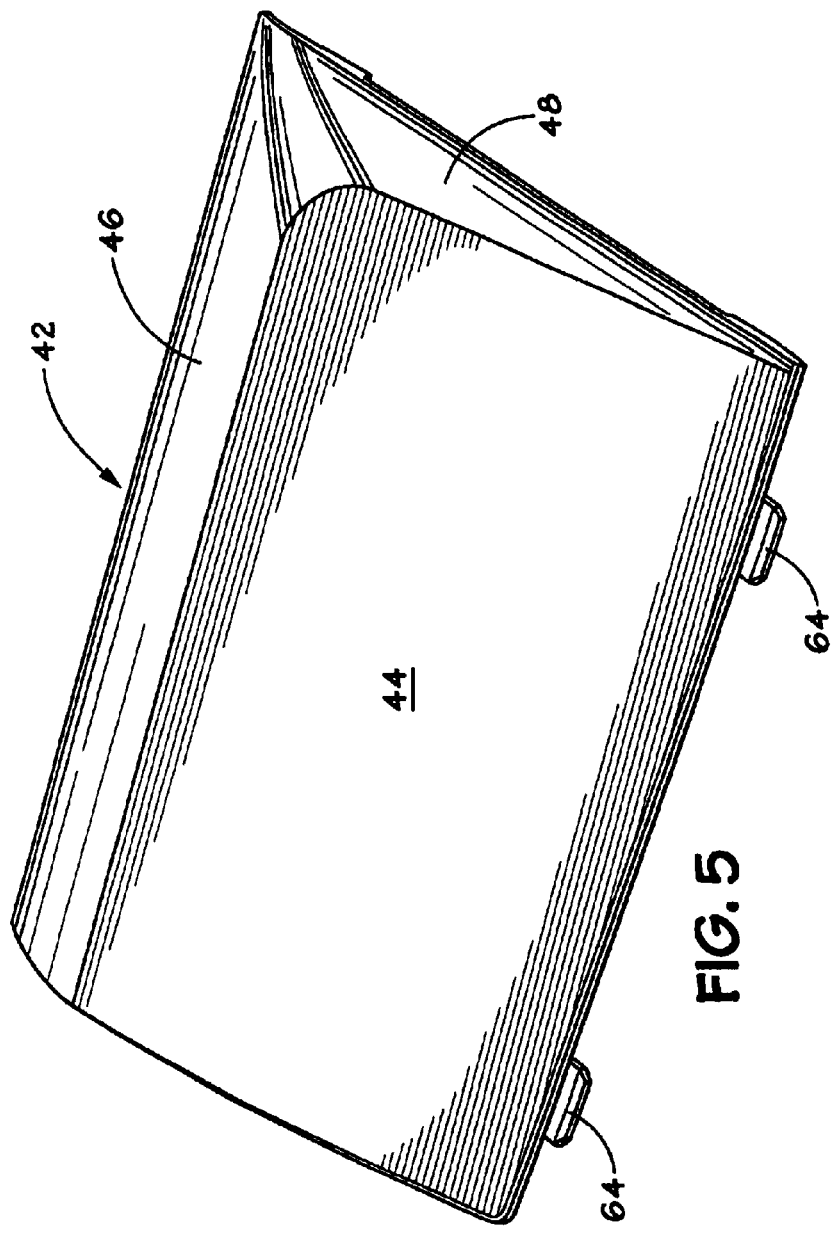
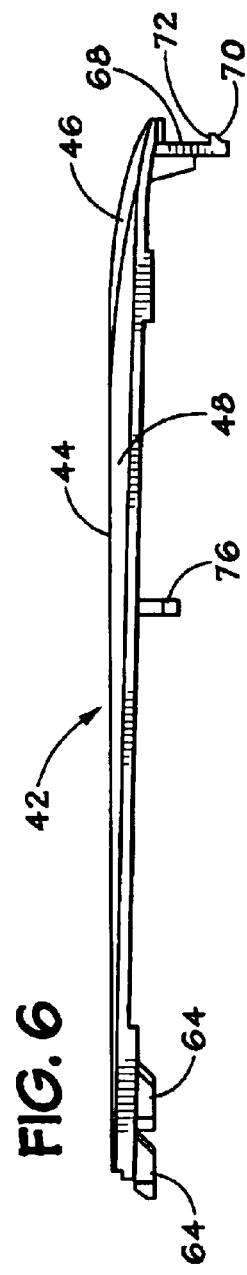
FIG. 5
FIG. 6

PORTABLE COMPUTER HAVING REMOVABLE COMPONENT COVER

FIELD OF THE INVENTION

The present invention generally relates to portable computers, and particularly to a portable computer having a readily removable cover to permit access to components, such as modem modules.

BACKGROUND OF THE INVENTION

In a variety of computers, particularly laptop and notebook computers, the size and aesthetics of the overall package are particularly important. Generally, numerous components must be packed into a relatively small space provided by the computer housing. This, of course, can lead to a greater level of difficulty in obtaining access to various internal components.

For example, in certain notebook computers, a variety of components are located under the palm rest area below the keyboard. Access to the components requires that the user disassemble the unit to remove the top deck or a portion of the top deck before gaining access to the desired components. It would be desirable to simplify this procedure.

SUMMARY OF THE INVENTION

The present invention features a technique for providing access to a variety of components, e.g. modem/network cards, real time clock batteries and BIOS firmware hubs, often found in portable computers. The technique utilizes a portable computer housing having a top deck with an opening disposed over one or more selected components. A motherboard is disposed within the portable computer housing beneath the top deck. This permits the one or more selected components to be readily coupled with the motherboard. A component cover is mounted over the opening and is configured to provide tool-less actuation. Thus, a user can simply grasp the component cover, move the component cover to an open position and gain access to the one or more selected components.

BRIEF DESCRIPTION OF THE DRAWINGS

The invention will hereafter be described with reference to the accompanying drawings, wherein like reference numerals denote like elements, and:

FIG. 5 is a front perspective view of the top of the component cover; and

FIG. 6 is a side view of the component cover.

DETAILED DESCRIPTION OF EXEMPLARY EMBODIMENTS

Figure 1:
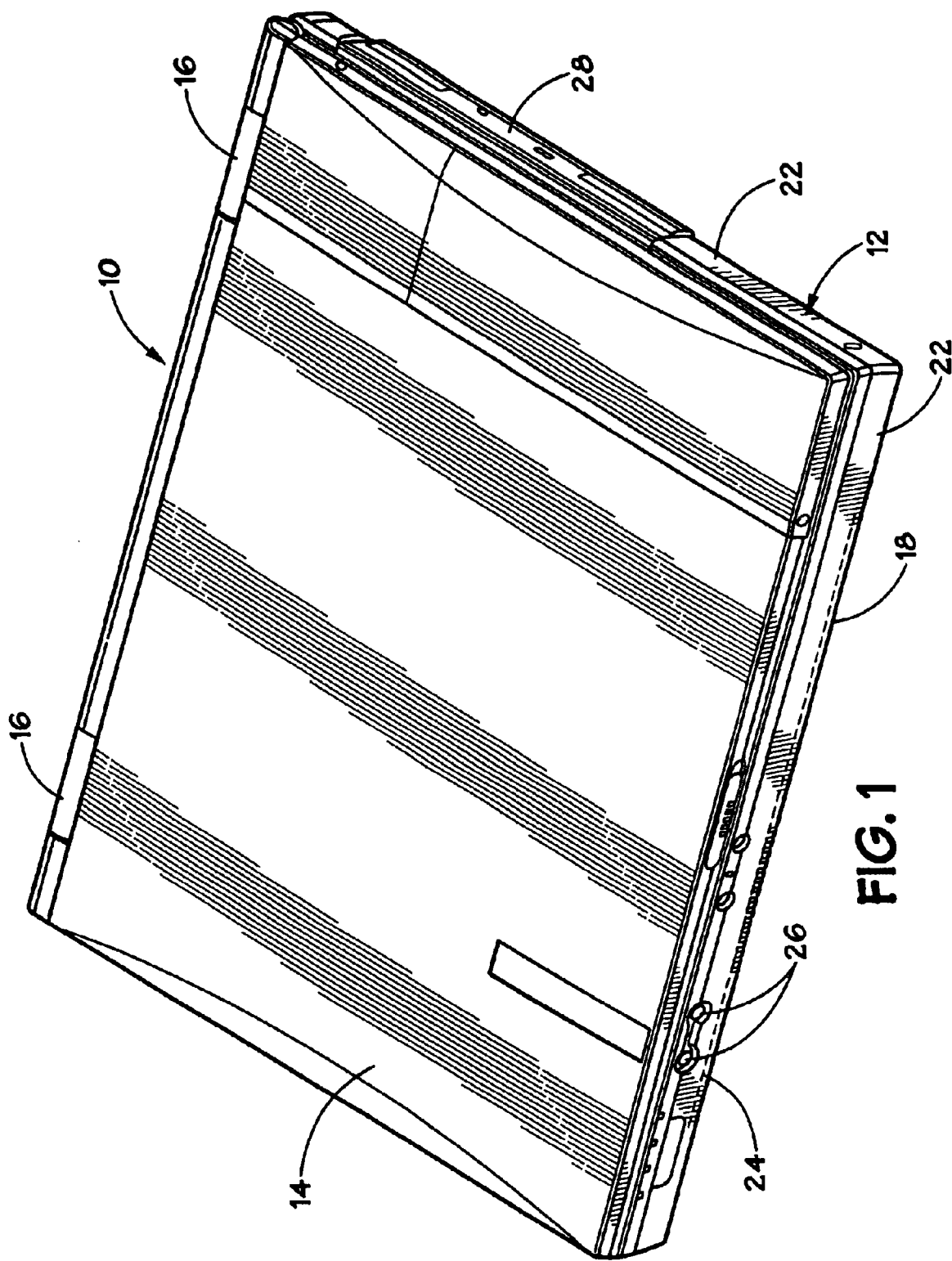
FIG. 1 is a front perspective view of an exemplary portable computer, such as a notebook computer, according to one embodiment of the present invention.

Referring generally to FIG. 1, an exemplary electronic device 10 is illustrated. In this embodiment, electronic device 10 is a portable computer and in particular, a notebook computer. Such portable computing devices are examples of devices that incorporate and benefit from features of the present invention, but the illustrated device is used as an example only and should not be construed as limiting the scope of the invention to these specific electronic devices. Hereinafter, electronic device 10 is referred to as portable computer 10 to facilitate explanation of the present invention.

Portable computer 10 comprises a base housing 12 coupled to a display 14. Display 14 may be moved between a closed position, as illustrated best in FIG. 1, and an open position, as illustrated best in FIG. 2. In the example illustrated, display 14 is coupled to base housing 12 by a hinge 16 that permits display 14 to be pivoted between the open and closed positions.

Base housing 12 typically has a bottom wall 18, a top deck 20 and a plurality of side walls 22 that extend between bottom wall 18 and top deck 20. Base housing 12 encloses a motherboard 24 disposed between bottom wall 18 and top deck 20. As is known to those of ordinary skill in the art, a variety of components, including one or more microprocessors, memory modules, drivers, etc. may be coupled to motherboard 24. Additionally, base housing 12 may be designed to provide openings for a variety of ports 26 and drives 28. The actual type and number of ports, drives and other features will vary with the design objectives of a given device.

Figure 2:
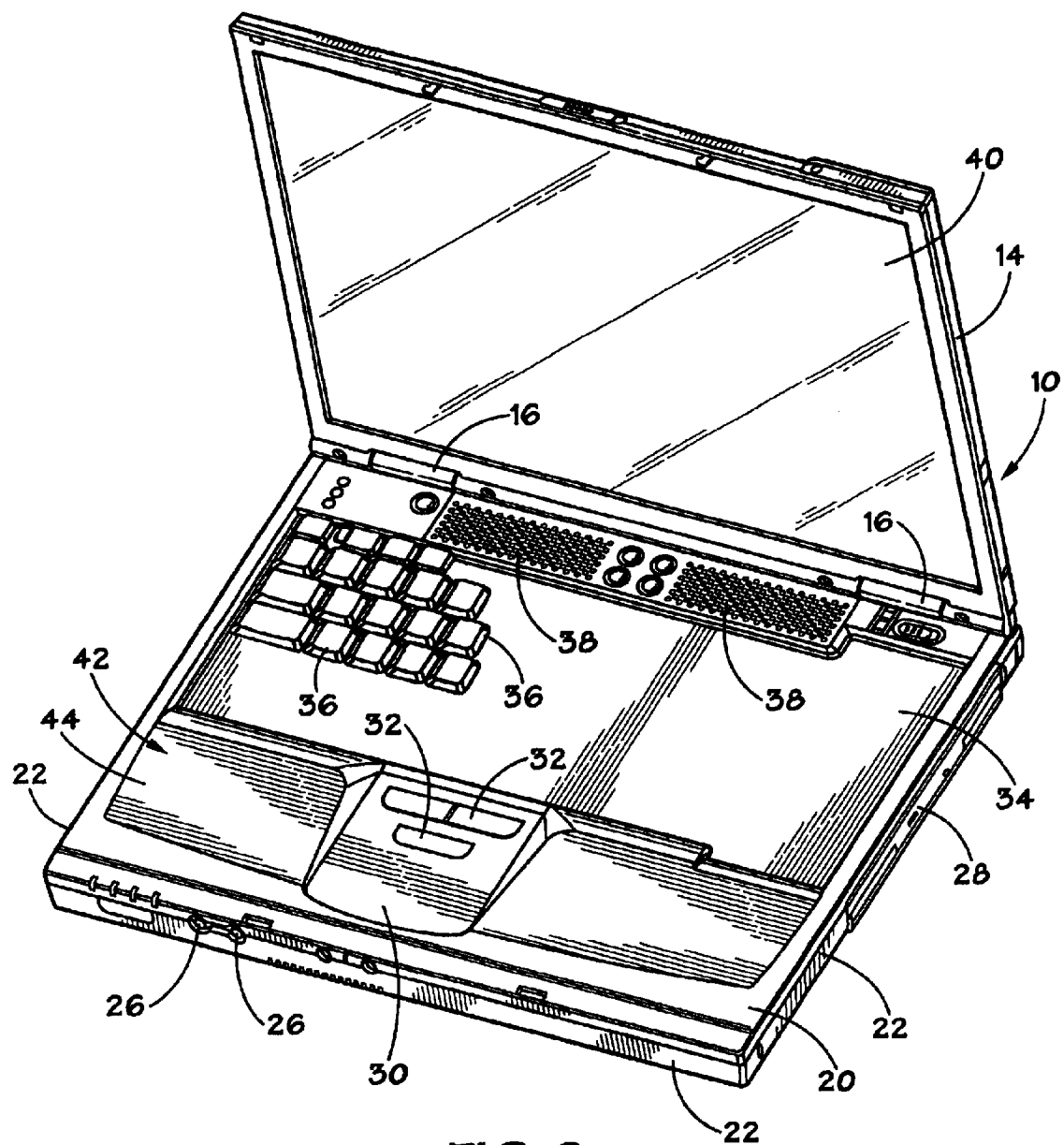
FIG. 2 is a view similar to FIG. 1 but showing a raised display screen.

As illustrated best in FIG. 2, portable computer 10 also includes one or more user interfaces, such as a mouse pad 30 having a plurality of control buttons 32. Another exemplary interface may include a keyboard 34 having a plurality of input keys 36. Portable computer 10 also may include a variety of other features, such as speakers 38 to provide audio output.

Display 14 may comprise a variety of displays designed to provide graphical information to a user. An exemplary display 14 is a flat screen display having a screen 40 on which graphical information is viewed.

Figure 3:
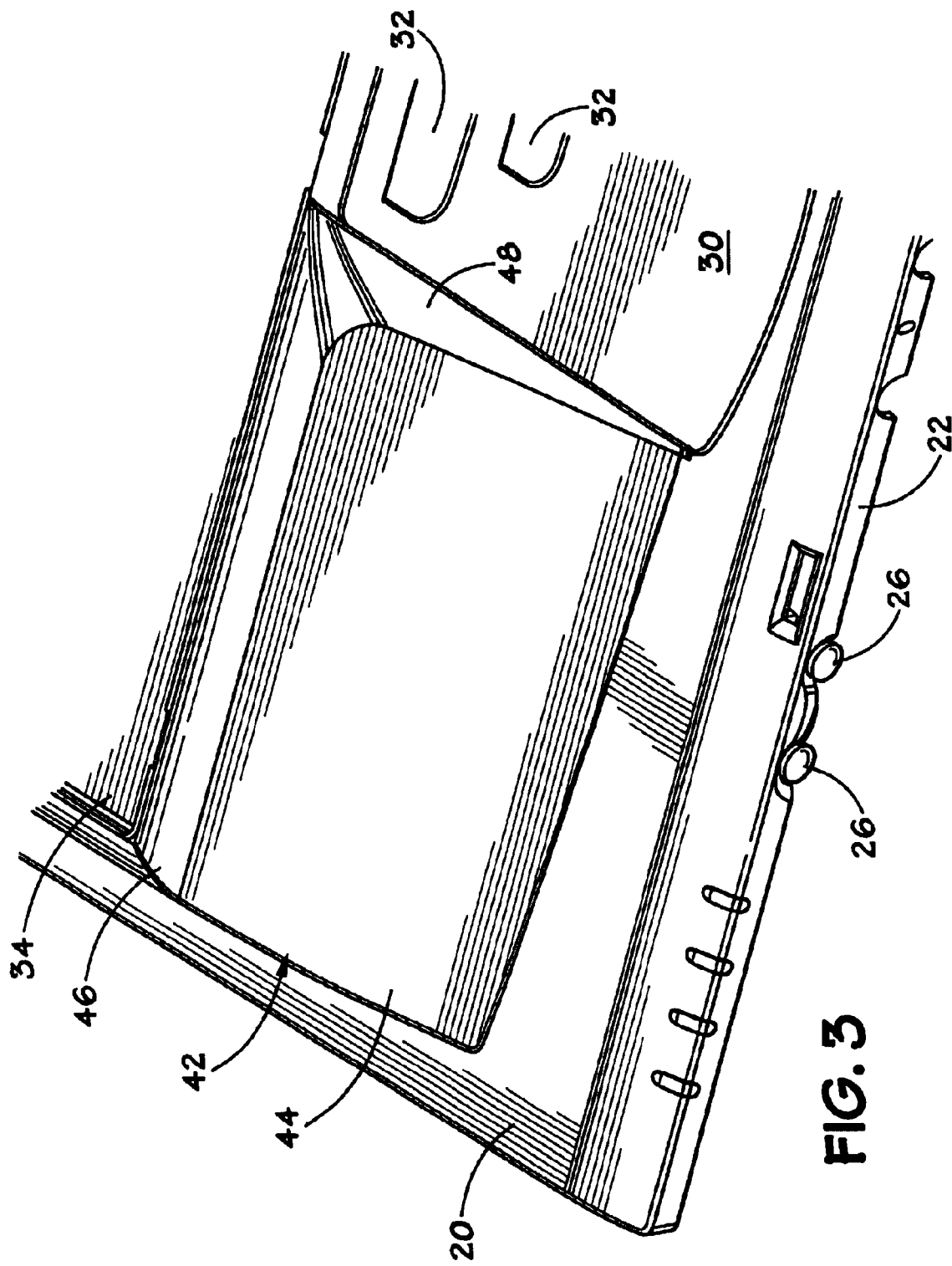
FIG. 3 is an enlarged perspective view of the component cover mounted in a closed position to the top deck of the portable computer.

As further illustrated in FIG. 3, portable computer 10 comprises a component cover 42 attached to top deck 20 on the user side of keyboard 34. Component cover 42 is designed to permit a user to rest his or her hand on a top surface 44 of component cover 42. Component cover 42 also allows tool-less access to components positioned beneath by simply moving the component cover to an open position. In the illustrated embodiment, the open position is one in which the component cover 42 is completely removed from top deck 20.

Top surface 44 extends to a beveled or slightly arcuate surface 46 and a pair of side surfaces 48. Surface 46 is disposed generally between keyboard 34 and top surface 44. Typically, surfaces 44, 46 and 48 are part of a unitary cover 42 that may be formed, for example, by injection molding a suitable plastic material.

Figure 4:
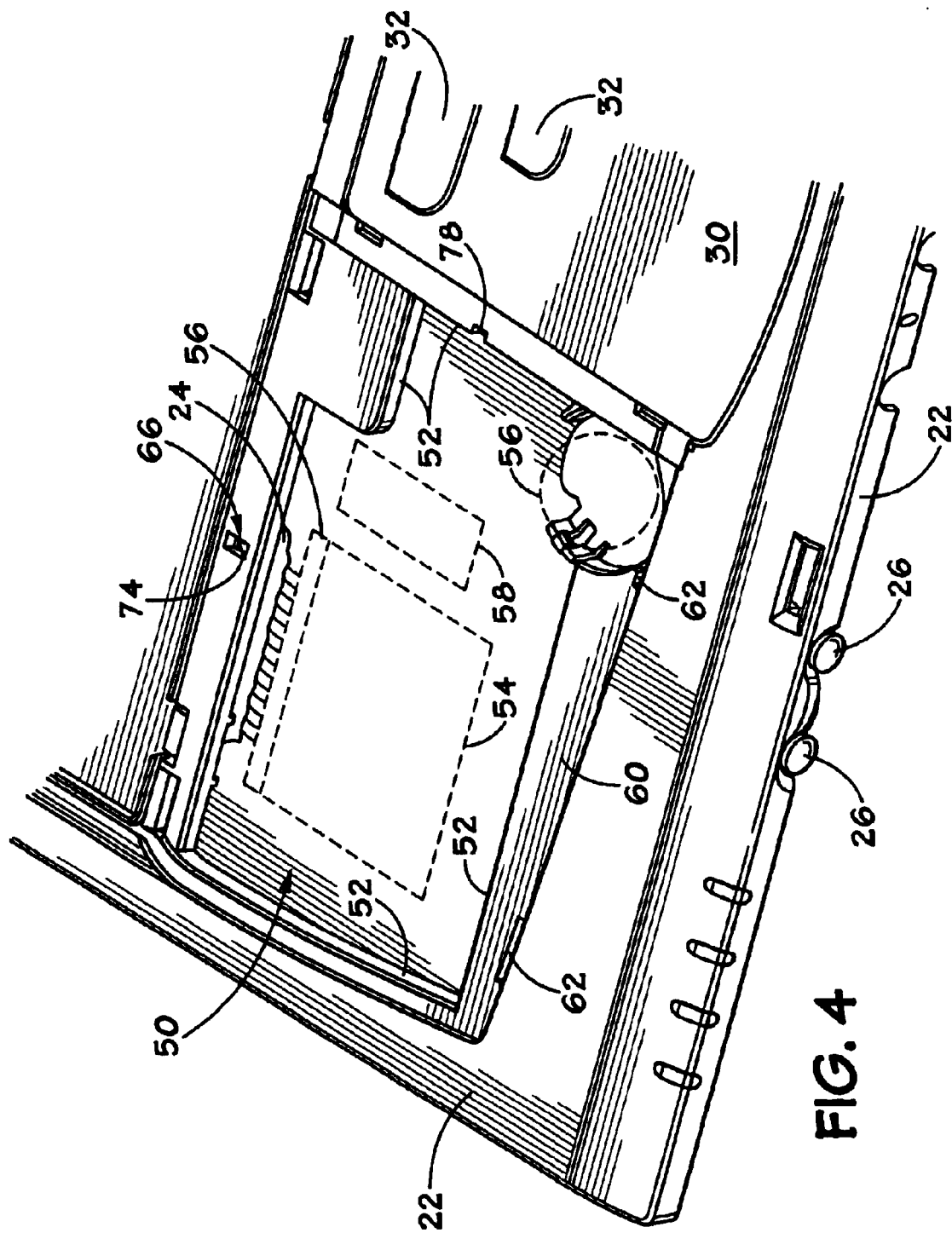
FIG. 4 is a view similar to FIG. 3 with the component cover removed.

As illustrated in FIG. 4, component cover 42 is designed to cover an opening 50 disposed through top deck 20 and defined by a perimeter edge 52. Opening 50 is designed to provide easy access to a variety of components that may require servicing, interchangeability, substitution of upgraded components, etc. Exemplary components include a modem or network card 54, such as a modem/NIC module, a real time clock battery 56 and a BIOS firmware hub 58. In the illustrated embodiment, all of these components are arranged under cover 42 to allow access through opening 50. Additionally, a variety of other components also may be located below opening 50 to provide easy access for a user.

Component cover 42 and opening 50 are particularly amenable for items such as card 54 that may commonly be changed, added or upgraded. Opening 50 allows a user to simply unplug card 54 from a corresponding plug connector 56 used to couple card 54 to motherboard 24. The actual design of card 54, plug connector 56 and optional card mounting systems may vary substantially from one computer to another.

Various features facilitate easy attachment and removal of component cover 42 by a user without the requirement of tools. As illustrated in FIG. 4, top deck 20 has a recessed region 60 disposed about the perimeter edge 52 that defines opening 50. Along this recessed region 60, a plurality of attachment features are designed to hold component cover 42 in place over opening 50 while permitting easy removal. For example, at least one and typically a pair of tab receptacles 62 are disposed in top deck 20 along the user side of recessed region 60. Tab receptacles 62 are designed to receive corresponding tabs 64 of component cover 42, as best illustrated in FIGS. 5 and 6.

Additionally, a latch or catch opening 66 is disposed through recessed region 60 of top deck 20 on a side of opening 50 generally opposite tab receptacles 62. Catch opening 66 is designed to receive a flexible catch 68, as best illustrated in FIG. 6. Flexible catch 68 includes a hook portion 70 sized for insertion through catch opening 66. An upper surface 72 of hook portion 70 engages a bottom surface 74 of top deck 20 when component cover 42 is attached to top deck 20 over opening 50. Release of flexible catch 68 simply requires that a user apply pressure to surface 46 until hook portion 70 is released from bottom surface 74 for removal through catch opening 66.

A variety of other features also may be incorporated into either or both top deck 20 or component cover 42 to further hold or stabilize component cover 42 over opening 50. For example, component cover 42 may comprise one or more stabilizer tabs 76, as best illustrated in FIG. 6.

The one or more stabilizer tabs 76 are positioned for receipt in one or more corresponding receptacles 78 disposed in top deck 20.

It should be noted that the number, design and location of the retention features can be adjusted according to various design parameters and application requirements. However, such features cooperate to allow tool-less, quick-release of component cover 42 from housing 12. This provides easy access to internal components, such as card 54, real time clock battery 56 and BIOS firmware hub 58.

It will be understood that the foregoing description is of preferred embodiments of this invention, and that the invention is not limited to the specific forms shown. For example, although the component cover is illustrated as used on a notebook computer, the cover also can be used on a variety of other portable computers and electronic devices; the shape and size of the component cover can be adjusted; the number and configuration of retention features may be adjusted; and the desired components disposed beneath the component cover can vary depending on design parameters. These and other modifications may be made in the design and arrangement of the elements without departing from the scope of the invention as expressed in the appended claims.

What is claimed is:

1. A portable computer, comprising:
    a portable computer housing having a top deck with an opening disposed over a selected component;
    a display coupled to the portable computer housing, the display being movable to a closed position along the top deck; and
    a component cover removably mounted over the opening, comprising:
        a coupling mechanism to secure a portion of the component cover detachably to the portable computer housing; and
        a force-displaceable coupling mechanism to secure a remaining portion of the component cover detachably to the portable computer housing;
        wherein the force-displaceable coupling mechanism biases the coupling mechanism into engagement with the housing.

2. The portable computer as recited in claim 1, further comprising a network card removably disposed beneath the component cover.

3. The portable computer as recited in claim 1, further comprising a real time clock battery disposed beneath the component cover.

4. The portable computer as recited in claim 1, further comprising a BIOS firmware hub disposed beneath the component cover.

5. The portable computer as recited in claim 1, wherein the coupling mechanism comprises at least one tab positioned to engage the portable computer housing proximate the opening.

6. The portable computer as recited in claim 5, wherein the force-displaceable coupling mechanism comprises at least one flexible catch disposed generally opposite the at least one tab to hold the component cover releasably over the opening.

7. The portable computer as recited in claim 1, wherein the component cover is formed from a plastic material.

8. The portable computer as recited in claim 1, wherein the display is coupled to the portable computer housing by a hinge.

9. The portable computer as recited in claim 2, wherein the coupling mechanism comprises at least one tab positioned to engage the portable computer housing proximate the opening.

10. The portable computer as recited in claim 9, wherein the force-displaceable coupling mechanism comprises at least one flexible catch disposed generally opposite the at least one tab to hold the component cover releasably over the opening.

11. The portable computer as recited in claim 2, wherein the portable computer housing is a notebook computer housing.

12. An electronic device, comprising:
    a device housing having a top deck with an opening disposed over a selected component;
    a display coupled to the device housing, the display being movable to a closed position along the top deck; and
    a component cover removably mounted over the opening, comprising:
        a force-actuated coupling mechanism; and
        at least one coupling mechanism cooperative with the force-actuated coupling mechanism to mount the component cover detachably to the device housing, such that the component cover can be removed and separated from the device housing.

13. The electronic device as recited in claim 12, further comprising a network card disposed beneath the component cover.

14. The electronic device as recited in claim 13, further comprising a real time clock battery disposed beneath the component cover.

15. The electronic device as recited in claim 13, further comprising a BIOS firmware hub disposed beneath the component cover.

16. The electronic device as recited in claim 12, wherein the at least one coupling mechanism comprises at least one tab positioned to engage the device housing proximate the opening.

17. The electronic device as recited in claim 16, wherein the force-actuated coupling mechanism comprises at least one flexible catch disposed generally opposite the at least one tab to hold the component cover releasably over the opening.

18. The electronic device as recited in claim 17, wherein the component cover is formed from a plastic material.

19. The electronic device as recited in claim 12, wherein the display is coupled to the device housing by a hinge.

20. The electronic device as recited in claim 13, wherein the at least one coupling mechanism comprises at least one tab positioned to engage the device housing proximate the opening.

21. The electronic device as recited in claim 20, wherein the force-actuated coupling mechanism comprises at least one flexible catch disposed generally opposite the at least one tab to releasably hold the component cover over the opening.

22. A method of facilitating replacement of a modem card in a device capable of communicating over a network, comprising:
    locating a modem card connector within a portable computer housing at a position between a motherboard and a top deck of the housing, the modem card connector being accessible via an opening in the top deck of the housing; and
    providing a detachable quick-release cover for the portable computer housing to cover the opening, such that the detachable quick-release cover can be released and freed from the portable computer housing.

23. The method as recited in claim 22, further comprising connecting a network card to the modem card connector.

24. The method as recited in claim 22, further comprising mounting a real time clock battery beneath the quick-release cover.

25. The method as recited in claim 22, further comprising placing a BIOS firmware hub beneath the quick-release cover.

26. The method as recited in claim 22, further comprising coupling the quick-release cover to the portable computer housing with a plurality of tabs.

27. The method as recited in claim 22, further comprising coupling the quick-release cover to the portable computer with a flexible catch.

28. The method as recited in claim 22, wherein locating comprises positioning the modem card connector in the opening adjacent to a computer keyboard.

29. A system of facilitating replacement of a modem card in a device capable of communicating over a network, comprising:
    a modem card connector located within a portable computer housing at a position between a motherboard and a top deck of the housing; and
    means for detachably coupling a cover to the portable computer housing to cover the opening, such that the cover can be released and disconnected from the portable computer housing.

30. The system as recited in claim 29, wherein the means for detachably coupling comprises attaching the cover via at least one flexible catch.

* * * * *